United States Patent [19]

Stefan et al.

[11] Patent Number: 4,905,125
[45] Date of Patent: Feb. 27, 1990

[54] ANTI REFLEX LAMP

[76] Inventors: George Stefan, 164 Grecian Pl., Ft. McMurray, Canada, T9H 2N1; George Spector, 233 Broadway, Rm. 3815, New York, N.Y. 10007

[21] Appl. No.: 236,174
[22] Filed: Aug. 25, 1988
[51] Int. Cl.[4] .............................................. B60Q 3/02
[52] U.S. Cl. .................................. 362/61; 362/74; 128/396
[58] Field of Search ............................ 362/61, 74, 293; 128/362, 380, 395, 396

[56] References Cited

U.S. PATENT DOCUMENTS 4,519,018  5/1985  Rowland ................................ 362/74
4,630,184  12/1986  Ferrero ................................ 362/293
4,646,210  2/1987  Skogler et al. ........................ 362/66

FOREIGN PATENT DOCUMENTS 0129519  12/1984  European Pat. Off. ............. 362/69
3333048  9/1983  Fed. Rep. of Germany ........ 362/74

Primary Examiner—Ira S. Lazarus
Assistant Examiner—Sue Hagarman

[57] ABSTRACT

A fatigue reducing device for a driver of a motor vehicle is provided and consists of a structure for producing an indirect, soft, purple light which causes the pupils of the eyes of the driver to constrict so that blinding effects of approaching headlights is greatly reduced during night time driving conditions.

3 Claims, 1 Drawing Sheet

ANTI REFLEX LAMP

BACKGROUND OF THE INVENTION

The instant invention relates generally to safety devices and more specifically it relates to a fatigue reducing device for a driver of a motor vehicle.

Numerous safety devices have been provided in prior art that are adapted to prevent motor vehilcle accidents by warning drivers to keep awake. For example, U.S. Pat. Nos. Re. 24,197; 3,227,998 and 4,219,800 all are illustrative of such prior art. While these units may be suitable for the particular purpose to which they address, they would not be as suitable for the purposes of the present invention as heretofore described.

SUMMARY OF THE INVENTION

A primary object of the present invention is to provide a fatigue reducing device for a driver of a motor vehicle that will overcome the shortcomings of the prior art devices.

Another object is to provide a fatigue reducing device for a driver of a motor vehicle that will eliminate eye fatigue, tiredness, headaches and loss of concentration during night time driving conditions.

An additional object is to provide a fatigue reducing device for a driver of a motor vehicle in which a lamp gives off a soft, purple light which causes the pupils of the driver's eyes to constrict so that the blinding effect of approaching headlights is greatly reduced, increasing the driver's comfort and safety during night time driving.

A further object is to provide a fatigue reducing device for a driver of a motor vehicle that is simple and easy to use.

A still further object is to provide a fatigue reducing device for a driver of a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
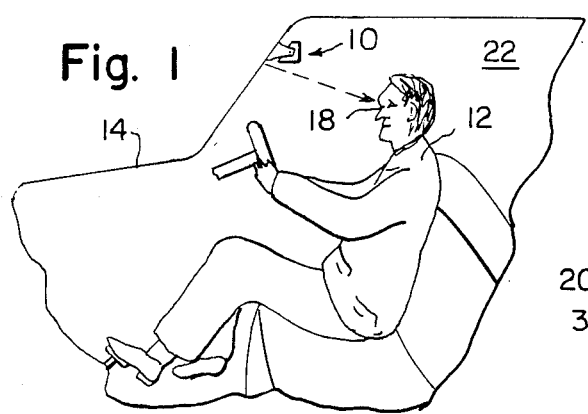
FIG. 1 is a partially diagrammatic side elevational view of the driver's compartment of a motor vehicle showing the invention therein.
Figure 2:
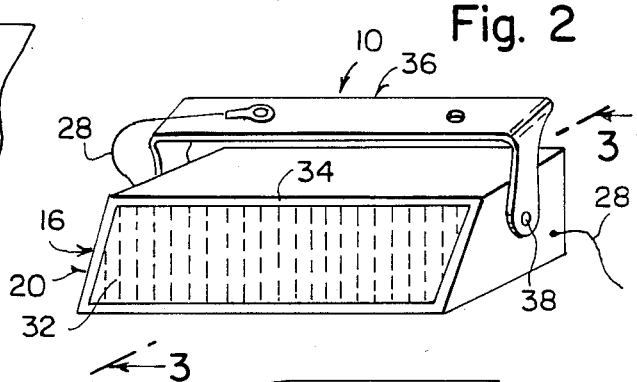
FIG. 2 is a perspective view of the invention.

Turning now descriptively to the drawings, in which similar reference characters denote similar elements throughout the several views, FIGS. 1 through 4 illustrates a fatigue reducing device 10 for a driver 12 of a motor vehicle 14. The device 10 consists of a structure 16 for producing an indirect, soft, purple light which causes the pupils of the eyes 18 of the driver 12 to constrict so that blinding effects of approaching headlights is greatly reduced during night time driving conditions. It will eliminate eye fatigue, tiredness, headaches and loss of concentration, thus increasing comfort and safety to the driver 12.

The indirect, soft, purple light producing structure 16 includes a housing 20 mounted within driver's compartment 22 of the motor vehicle 14. A light source 24, such as a light bulb, is disposed within the housing 20, a power source 26, such as a battery, is electrically connected in a circuit 28 to the light source 24 and a switch 30 is in the circuit 28 to manually turn the light source 24 and a switch 30 is in the circuit 28 to manually turn the light source 24 on and off. A transparent purple plate 32 is located in front wall 34 of the housing 20 so that when the switch 30 is turned on, the light source 24 will go on and shine through the plate 32 producing the indirect, soft purple light therefrom.

Figure 1A:
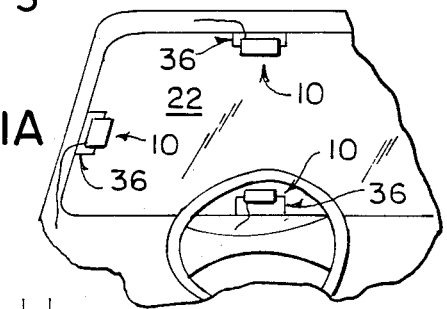
FIG. 1A is a fragmental diagrammatic internal view of the driver's compartment showing various locations for the invention.
Figure 3:
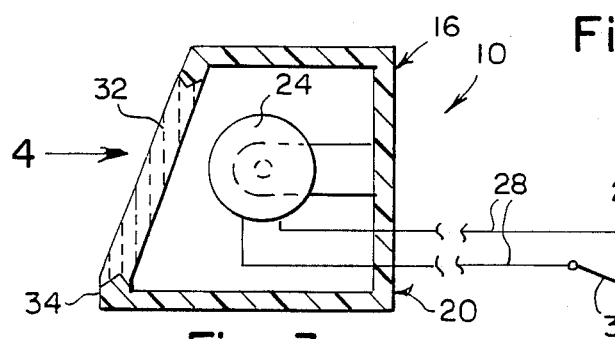
FIG. 3 is a cross sectional view taken along line 3—3 in FIG. 2, with wiring diagram attached thereto.
Figure 4:
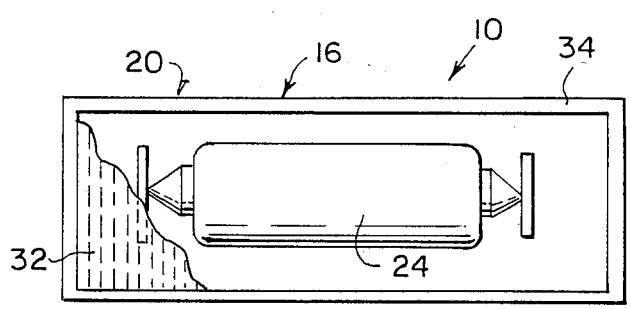
FIG. 4 is a front view as indicated by arrow 4 in FIG. 3, with the purple transparent plate broken away to show the lamp therein.

A mounting bracket 36 is provided and is pivotly attached to the housing 20 at 38. The bracket 36 can be attached in one of a number of positions within the driver's compartment 22 as shown in FIG. 1A. The housing 20 can be adjusted so that the indirect, soft purple light will not shine directly into the eyes 18 of the driver 12.

Figure 5:
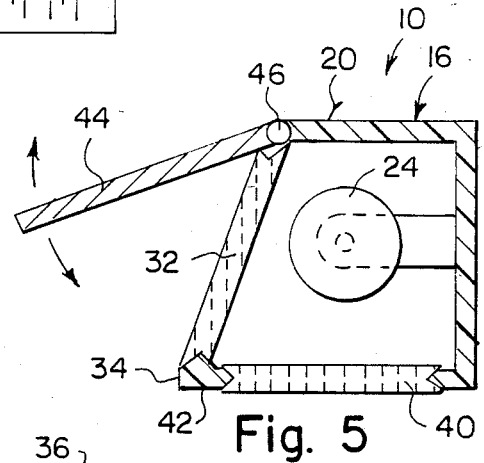
FIG. 5 is a cross sectional view similar to FIG. 3 of a modification with a translucent adjustable shade and a bottom purple transparent plate thereon.

FIG. 5 shows a second transparent purple plate 40 located in bottom wall 42 of the housing 20. When the switch 30 is turned on the light source 24 will go on and shine through the first plate 32 and the second plate 40, producing more diffusion of the indirect, soft purple light therefrom. A translucent shade 44 is pivotly mounted at 46 to top portion of the front wall 34 of the housing, so that the shade 44 can be angularly positioned in front of the first plate 32 to reflect some of the indirect, soft purple light therefrom, producing more diffusion.

Figure 6:
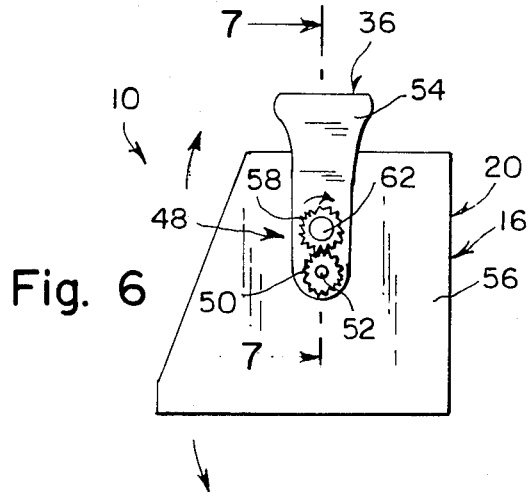
FIG. 6 is a side view of another modification having a gear adjustment member on the bracket to position the housing at various angles.
Figure 7:
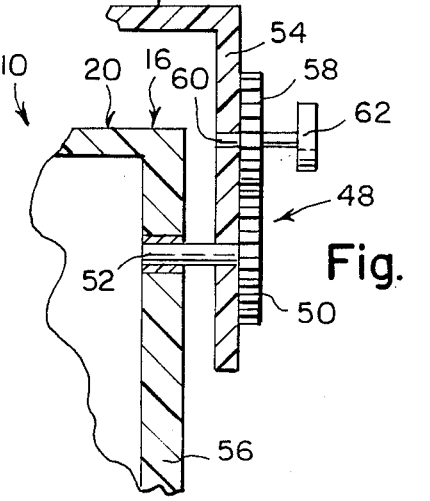
FIG. 7 is a cross sectional view taken along line 7—7 in FIG. 6 showing the gear adjustment member in greater detail.

FIGS. 6 and 7 show a gear adjustment member 48 on the bracket 36 to position the housing 20 at various angles. The gear adjustment member 48 includes a first gear 50 that has a rotatable shaft 52 extending through one side 54 of the bracket 36 and into one side 56 of the housing 20. A second gear 58 is provided and has a rotatable shaft 60 on the bracket 36 in which the second gear 58 meshes with the first gear 50. A control knob 62 is affixed to the rotatable shaft 60 on the second gear 58 so that when the person 12 manually turns the control knob 62 the gears 50 and 58 will turn causing the housing 20 to pivot on the bracket 36.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fatigue reducing device for a driver of a motor vehicle which comprises means for producing an indirect, soft, purple light mounted on a vehicle interior and directed at the eyes of the driver to reduce eye fatigue from effects of approaching headlights, wherein said indirect, soft purple light producing means includes:
   (a) a housing with a front wall and a bottom wall;
   (b) means for mounting said housing within driver's compartment in front of and above the drivers eyes;
   (c) a light source disposed within said housing;
   (d) a power source electrically connected in a circuit to said light source;
   (e) a switch in the circuit to manually turn said light source on and off;
   (f) a transparent purple plate located in front wall of said housing facing away from said driver so that when said switch is turned on, said light source will shine through said plate away from the drivers eye producing said indirect, soft, purple light therefrom, wherein said mounting means is a bracket pivotly attached to said housing, whereby said bracket can be attached in one of a number of positions within the driver's compartment and said housing can be adjusted so that said, soft, purple light will not shine directly into the eyes of the driver, further comprising a second transparent purple plate located in said bottom wall of said housing so that when said switch is turned on, said light source will shine separately through both said first plate and said second plate, thereby providing more diffusion due to different paths of diffused light.

2. A fatigue reducing device as recited in claim 1, further comprising a translucent shade pivotly mounted to top portion of said front wall of said housing of said first plate to reflect some of the indirect, soft, purple light therefrom. producing additional paths of diffused light.

3. A fatigue reducing device as recited in claim 1, further comprising a gear adjustment member mounted on a side of said bracket to position said housing at various angles, wherein said gear adjustment member includes:
   (a) a first gear having a rotatable shaft extending through said side of said bracket and into said housing;
   (b) a second gear having a rotatable shaft mounted on said side of bracket wherein said second gear meshes with said first gear; and
   (c) a control knob affixed to said rotatable shaft on said second gear so that when the person manually turns said control knob said gears will turn causing said housing to pivot on said bracket, to vary the angular position of said plates relative to said bracket.

* * * * *